April 28, 1942.         K. D. HUBBARD         2,281,353
FULL UNIVERSAL ALL-SPEED MILLING ATTACHMENT
Filed Feb. 20, 1939        2 Sheets-Sheet 1

Inventor
KUTEMAN D. HUBBARD
Attorney.

April 28, 1942.    K. D. HUBBARD    2,281,353
FULL UNIVERSAL ALL-SPEED MILLING ATTACHMENT
Filed Feb. 20, 1939    2 Sheets-Sheet 2
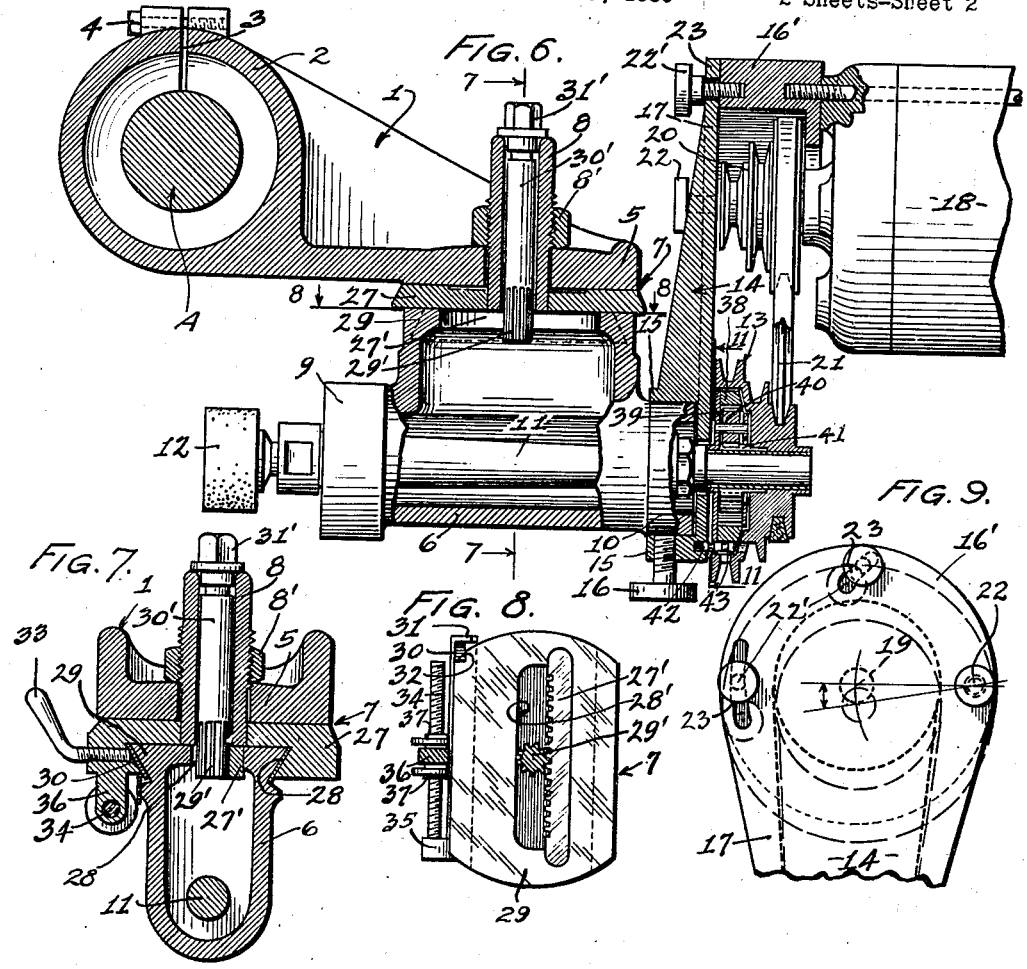
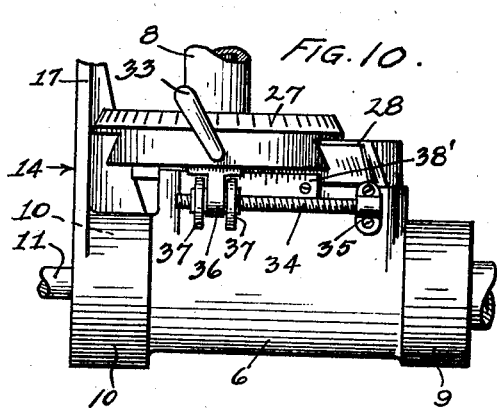
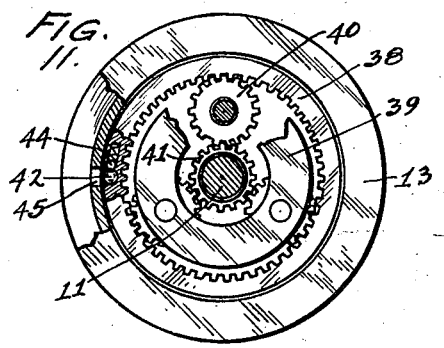
Inventor
KUTEMAN D. HUBBARD
by Arthur L. Mack
Attorney Patented Apr. 28, 1942

2,281,353

UNITED STATES PATENT OFFICE 2,281,353

FULL UNIVERSAL ALL-SPEED MILLING ATTACHMENT

Kuteman D. Hubbard, Los Angeles, Calif., assignor to Russel R. Fray, Beverly Hills, Calif.

Application February 20, 1939, Serial No. 257,307

7 Claims. (Cl. 90—17)

This invention relates in general to milling machine attachments but more particularly to an all-angle, all-speed attachment for application to standard milling machines by means of which various and sundry milling operations may be effected which are not possible of accomplishment with other milling devices.

An object is to provide a unitary attachment including an individual motor drive which is adapted to be mounted for longitudinal adjustment on and rotatable to an extent of 360 degrees around the usual over-arm of a standard milling machine so as to position a tool carried thereby at any desired angle in a vertical plane relative to the work on which the tool is adapted to operate.

Another object is to provide a tool mounting and driving means rotatably adjustable in a plane other than a vertical plane about the axis on which the unit is bodily adjustable for disposing the tool in selected horizontal or inclined planes for operative engagement with the work.

A further object is to provide a driven spindle for the tool which is suitably incorporated in said unit and includes a source of power such as an electric motor which is adjustably mounted for common adjustment with said spindle and for individual adjustment relative to said spindle for the purpose of quickly and easily changing the driving ratio between the motor and spindle when it is desired to vary the speed of the spindle in the performance of various kinds of work.

Other and more detailed objects of my invention will appear as the description of my improvements progresses.

It will be understood that in the use and operation of standard milling machines the milling tools are usually attached to or gear connected with the main driven spindles of such machines and that the range of usefulness of such tools is necessarily limited to certain kinds of operations, thereby lacking the universality of adjustment and usefulness which may be effected with my improvements hereinafter described, and, moreover, the application of power to the main or an auxiliary spindle provided in some attachments now in use is not sufficiently variable or satisfactory enough to adapt a milling machine to universal usage. In my improvements, however, I am enabled to universally adapt a milling machine by the application of my complete unit thereto for substantially all of the different types of work without rearranging or altering the mechanism of a standard type of milling machine, as will readily appear upon consideration of the structure and operation of my improved attachment.

I have shown a preferred embodiment of my invention in the drawing accompanying this application, subject to modification, within the scope of the appended claims, without departing from the spirit of my invention.

In said drawing:

Figures 1, 2, 3, 4, and 5 are perspective views of the milling attachment embodying my improvements mounted in different positions on a milling machine for use;

Figure 6 is a vertical sectional elevation of the assembled attachment as viewed rearwardly when the attachment is in position as shown in Figure 4;

Figure 7 is a sectional elevation on line 7—7 of Figure 6;

Figure 8 is a sectional view on line 8—8 of Figure 6;

Figure 9 is a partial view of the motor and motor mounting as seen from the left in Fig. 6 when detached from the unit;

Figure 10 is a fragmentary side elevation of the tool mounting corresponding in position to the showing of Figure 6; and Figure 11 is a section on line 11—11 of Figure 6 showing the back gearing unit associated with the driving mechanism.

Figure 1:
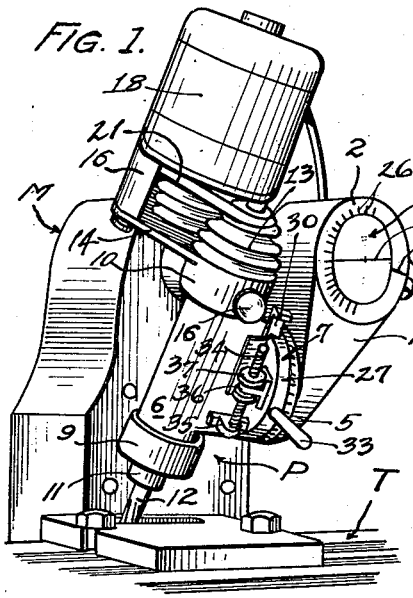
Figure 2:
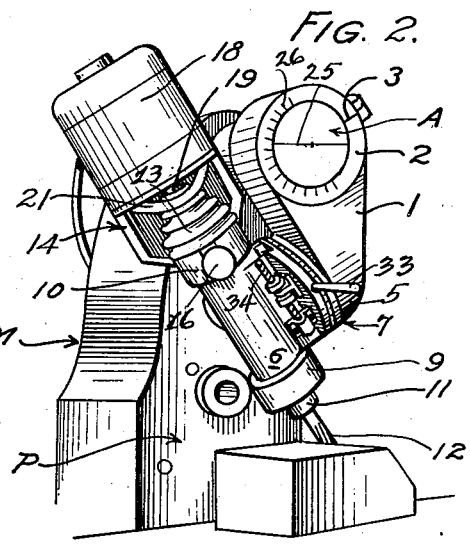
Figure 3:
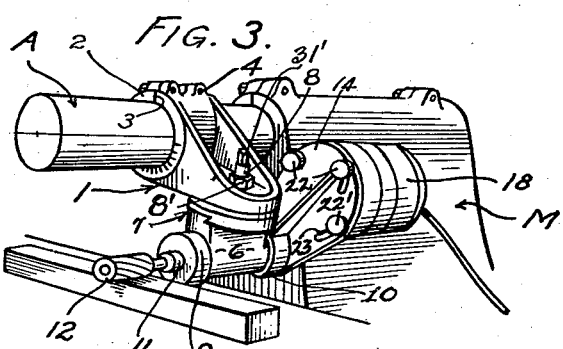
Figure 4:
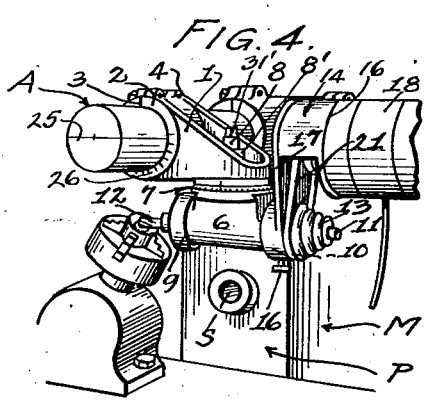
Figure 5:
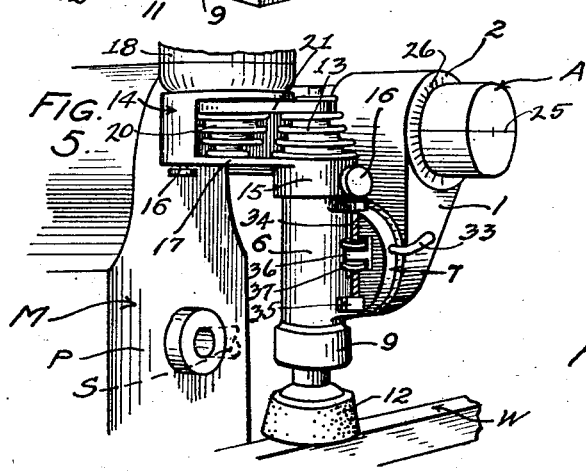

As shown in assembled position and mounted in position for use in Figures 1 to 5 inclusive, my attachment is adapted to be operatively held on a milling machine generally represented at M and including a face plate P, a table T, a main spindle S and an over-arm A, all of which elements are standard in a milling machine design and not a part of my invention. I utilize the over-arm A as a support for my improved attachment and to this end I provide a bracket 1 having a hub 2 which is bored to slidably and rotatably receive the arm A and is slit at 3 so as to be frictionally clamped in a selected position on arm A as by means of bolts 4. Said bracket has an outwardly projecting boss 5 whose axis is at right angles to the axis of hub 2 against a face of which a spindle mounting 6 is rotatably held, said mounting having a head 7 with a face frictionally engaging the face of boss 5. The bracket 1 and mounting 6 are adjustably held together in selected relationship as by means of a central bolt 8. Mounting 6 is provided with spaced bearings 9 and 10 which rotatably and preferably frictionlessly carry a spindle 11 which is effective for operatively holding a tool 12 at one end thereof and a cone pulley 13 at its other end.

Intermediate the bearing 10 and pulley 13, a bracket 14 is held at its hub 15 rotatably adjustable on said bearing and may be fixed in its position as by means of a set screw 16. Bracket 14 also has a boss 16' connected by a web 17 with hub 15 to which is suitably attached an electric motor 18 having a shaft 19 with a cone pulley unit 20 fixed to the inner end of said shaft for operative connection with pulley 13 as by means of a belt 21.

Motor 18 is mounted so as to swing on a supporting rod or bolt, as at 22, which is fixed to the portion 16' and set screws 22' extend through arcuate slots 23 in the portion 16' of said bracket. Thus, the motor may be swung into and from driving position relative to spindle 11 and locked in either position, for respectively tightening or loosening the belt 21.

Boss 5 of bracket 1 and head 7 of mounting 6 are calibrated at adjacent portions of their peripheries so as to rotatably adjust said mounting on said bracket for selectively positioning the tool 12 at a desired angle in a plane paralleling the mating faces of boss 5 and head 7, such adjustment being accomplished by first loosening the nut 8' on the bolt 8, adjusting the mounting to a selected position and then tightening nut 8'. The entire unit may be adjusted about the axis of over-arm A relative to a mark 25 on over-arm A by reason of calibrations 26 on an end of boss 2 of bracket 1.

Head 7 of mounting 6 hereinabove generally referred to is of composite character in that it embodies a rotatably adjustable member 27 provided with a reentrant groove 28 on its lower side adapted to slidably engage a correspondingly formed tongue 29 integral with mounting 6, and a longitudinally tapered wedge 30 insertible between adjacent portions of said tongue and groove on at least one side thereof, for the purpose of taking up any prevailing clearance and compensating for wear (see Figure 7). Said wedge has a gib 31 on a projecting end thereof which overhangs a flat 32 on the periphery of member 27 so as to limit the inward movement of the wedge.

Member 27 also carries a locking screw 33 which engages wedge 30 and serves to lock said wedge, member 27 and portion 29 together in adjusted positions. Member 27 carries on a side thereof a lock for holding mounting 6 in longitudinally adjusted position on member 27 in groove 28 and a threaded stud 34 fixedly held at one end in a lug 35 and adapted to slidably receive a lug 36 depending from member 27. A pair of lock nuts 37, 37 are threaded onto stud 34 on opposite sides of lug 36 so that said nuts may be tightened against opposite sides of lug 36 when member 27 is set in a desired position. A rule 38' is held on a side of mounting 6 adjacent the lower side of member 27 by reason of which a mark on member 27 may be registered with a graduation on said rule for measurably establishing the distance off-center to which the mounting 6 may be adjusted in a giving setting thereof. Mounting 6 is adjusted on member 27 by means of a rack 27' adjacent an elongated slot 28' in portion 29 and said rack meshes with a pinion 29' on the lower end of a shaft 30' carried by bolt 8 and having an external head 31' outwardly of nut 8' to which a tool may be applied for adjusting member 27 to a desired extent.

Power is applied to spindle 11 from motor 18 through belt 21 and pulley unit 13, said pulley unit including an internal planetary back-gear drive, as shown in Figures 6 and 11. The inner and larger end of pulley 13 is recessed to receive an internal ring gear 38 in which gear is mounted a cage or carrier 39 for rotatably supporting a plurality of pinions 40—40, etc. at uniform distances from the axis of the pulley and in mesh with said ring gear. Pinions 40 also mesh with a pinion 41 fixed to pulley 13 in a suitable manner. Cage 39 is fixed to spindle 11 by suitable means while pulley 13 is loose on said spindle.

Pulley 13 and ring gear 38 are adapted to be locked together for common rotation as by means of a sliding pin 42 which may have depressions as at 43 associated with a spring held detent 44 for holding the pin in locked and unlocked positions as desired, said pin being carried by ring gear 38 and movable into an aperture 45 in pulley 13 or into a corresponding aperture in boss 15 of bearing 10 of mounting 6. Thus, when said ring gear and said pulley are locked together, the entire unit will rotate bodily and drive spindle through cage 39 which is permanently fixed to the spindle, but when the back gear connection is desired the ring gear 38 is locked as by means of pin 42 to the adjacent end of bearing 10 of mounting 6, thereby preventing rotation of gear 38. Therefore, motion at a reduced speed and consequent increase of the power ratio is transmitted from belt 21 to pulley 13 and thence through gears 40 and 41 to spindle 11, as in usual back-gear driving mechanisms.

In operation, the attachment as a unit is slidably positioned on over-arm A after which it may be moved longitudinally and rotatably on said arm to a desired position for operation of the tool 12 to the work as at W. In such a setting-up operation, the mounting 6 carrying the tool 12 and the motor 18 are rotatably adjusted on bracket 1 and also longitudinally with respect to said bracket by the means shown in Figures 6, 7, 8, and 10. The drive to the spindle 11 is then adjusted by placing belt 21 in the desired corresponding pulley grooves and by locking or unlocking the back-gear drive, as may be desired.

It is noteworthy that the milling unit herein shown and described does not interfere with the operation of the tools applied directly to the main spindle S of a milling machine M or with other operations thereof, inasmuch as the attached unit may be moved backwardly against face plate P and swung upwardly above arm A to a position of complete non-interference without removing any parts thereof from a position from which the unit may be subsequently adjusted and set for a succeeding operation of the attachment. The driving means being separate and apart from that of the milling machine proper provides for a range of operations and utility which is not accomplished in the operation and use of commercial machines.

What I claim as new is:

1. A milling attachment of the character described comprising a bracket for attachment to the overarm of a milling machine, a member rotatably adjustable on said bracket, a spindle mounting slidably supported on said member, means for moving said mounting relative to said member, and a shaft having its axis coincident with the axis of rotation of said member for operating said means.

2. A milling attachment of the character described comprising a bracket for attachment to the overarm of a milling machine, a member rotatably adjustable on said bracket, a spindle mounting slidably supported on said member, a rotatable shaft having its axis coincident with the axis of rotation of said member, and a pinion on said shaft cooperating with a rack on said spindle mounting, whereby rotation of said shaft will move said mounting relative to said member.

3. A milling attachment of the character described comprising a bracket for attachment to the overarm of a milling machine, a hollow bolt, a member supported on said bracket for rotation about said bolt, a spindle mounting slidably supported on said member, and means operable by a shaft extending through said hollow bolt for moving said mounting relative to said member.

4. A milling attachment of the character described comprising a bracket for attachment to the overarm of a milling machine, a hollow bolt, a member supported on said bracket for rotation about said bolt, a nut on said bolt for securing said member in fixed position on said bracket, a spindle mounting slidably supported on said member, and means operable by a shaft extending through said hollow bolt for moving said mounting relative to said member.

5. A milling attachment of the character described comprising a bracket for attachment to the overarm of a milling machine, a hollow bolt, a member supported on said bracket for rotation about said bolt, a spindle mounting slidably supported on said member, a shaft extending through said hollow bolt, and a pinion on said shaft cooperating with a rack on said spindle mounting, whereby rotation of said shaft will move said mounting relative to said member.

6. A milling attachment of the character described comprising a spindle mounting rotatably adjustable on the overarm of a milling machine, a spindle in said mounting, said mounting also being rotatably adjustable about an axis at right angles to the axis of said overarm and said spindle whereby said spindle may be adjusted to any desired angle, a motor support projecting from said mounting, and a motor on said support, said support being rotatably adjustable about the axis of said spindle whereby the motor may be moved to a position remote from work on the machine and the angular adjustment of said spindle facilitated.

7. A milling attachment of the character described comprising a spindle mounting rotatable adjustable on the overarm of a milling machine, a spindle in said mounting, said mounting also being rotatably adjustable about an axis at right angles to the axis of said overarm and said spindle whereby said spindle may be adjusted to any desired angle, means for adjusting said spindle radially with respect to said first mentioned axis, a motor support projecting from said mounting, and a motor on said support, said support being rotatably adjustable about the axis of said spindle whereby the motor may be moved to a position remote from work on the machine and the angular adjustment of said spindle facilitated.

KUTEMAN D. HUBBARD.